(12) United States Patent
Huang et al.

(10) Patent No.: US 12,314,075 B2
(45) Date of Patent: May 27, 2025

(54) KNOB STRUCTURE

(71) Applicant: AUO Corporation, Hsin-Chu (TW)

(72) Inventors: Wei-Chieh Huang, Hsin-Chu (TW); Jung-Chun Chen, Hsin-Chu (TW)

(73) Assignee: AUO CORPORATION, Hsin-Chu (TW)

( * ) Notice: Subject to any disclaimer, the term of this patent is extended or adjusted under 35 U.S.C. 154(b) by 44 days.

(21) Appl. No.: 18/540,941

(22) Filed: Dec. 15, 2023

(65) Prior Publication Data
US 2025/0053187 A1 Feb. 13, 2025

(30) Foreign Application Priority Data
Aug. 8, 2023 (TW) ................................. 112129832

(51) Int. Cl.
| | |
|---|---|
| *B60K 35/10* | (2024.01) |
| *G05G 1/08* | (2006.01) |
| *G05G 1/10* | (2006.01) |
| *G05G 5/04* | (2006.01) |
| *G05G 5/05* | (2006.01) |
| *G05G 5/06* | (2006.01) |
| *G05G 11/00* | (2006.01) |

(52) U.S. Cl.
CPC .............. *G05G 11/00* (2013.01); *B60K 35/10* (2024.01); *G05G 1/08* (2013.01); *G05G 1/10* (2013.01); *G05G 5/04* (2013.01); *G05G 5/05* (2013.01); *G05G 5/06* (2013.01); *B60K 2360/133* (2024.01); *G05G 2505/00* (2013.01)

(58) Field of Classification Search
CPC .. G05G 1/10; G05G 5/16; G05G 5/22; H01H 3/50
See application file for complete search history.

(56) References Cited

U.S. PATENT DOCUMENTS

| | | | | |
|---|---|---|---|---|
| 6,281,453 | B1 * | 8/2001 | Uleski ..................... | H01H 19/03 200/336 |
| 11,469,061 | B2 * | 10/2022 | Marcotte ................ | H01H 19/14 |
| 2008/0229871 | A1 * | 9/2008 | Kramlich ............... | B60K 35/10 200/43.11 |
| 2014/0137458 | A1 * | 5/2014 | Crispin .................... | G05G 1/10 42/119 |
| 2021/0265120 | A1 * | 8/2021 | Marcotte ................ | H01H 19/08 |
| 2022/0136572 | A1 | 5/2022 | Blank | |

FOREIGN PATENT DOCUMENTS

| | | | |
|---|---|---|---|
| CN | 204477362 U | 7/2015 | |
| CN | 110450719 A | 11/2019 | |
| CN | 110945616 A * | 3/2020 | .............. G05G 1/02 |
| TW | M547746 U | 8/2017 | |

* cited by examiner

*Primary Examiner* — Daniel D Yabut
(74) *Attorney, Agent, or Firm* — WPAT, PC

(57) ABSTRACT

A knob structure includes a base support, a knob portion, a seat and a plurality of elastic pieces. The knob portion has an inner wall surface. The inner wall surface is inclined to an axis and surrounds the axis to define a space. The knob portion is signally connected to a processor and configured to rotate relative to the base support about the axis. The seat is at least partially located in the space. The seat is at least partially sleeved to the base support and configured to move relative to the base support along the axis. The elastic pieces are disposed on the seat and configured to abut against the inner wall surface.

15 Claims, 11 Drawing Sheets

KNOB STRUCTURE

RELATED APPLICATIONS

This application claims priority to Taiwan Application Serial Number 112129832, filed Aug. 8, 2023, which is herein incorporated by reference in its entirety.

BACKGROUND

Technical Field

The present disclosure relates to knob structures. More particularly, the present disclosure relates to knob structures suitable to be used for car displays.

Description of Related Art

When driving a car, apart from concentrating on controlling the steering wheel, the driver must also pay attention to the settings of different electronic devices in the car. For example, the driver has to adjust the volume of the speaker, the receiving channel of the radio, or the temperature of the air conditioner in the car, etc.

Generally speaking, the driver can control the functions above by turning the knob on the car display. However, with the advancement of the technology, more functions are available in a car nowadays. Therefore, with regard to different functions, the solution to allow drivers to make appropriate adjustments in a simple and easy manner is undoubtedly an important issue in the industry.

SUMMARY

A technical aspect of the present disclosure is to provide a knob structure, which can allow a user to change the resistance when rotating according to a function to be controlled, which facilitates an appropriate adjustment to different functions.

According to an embodiment of the present disclosure, a knob structure includes a base support, a knob portion, a seat and a plurality of elastic pieces. The knob portion has an inner wall surface. The inner wall surface is inclined to an axis and surrounds the axis to define a space. The knob portion is signally connected to a processor and configured to rotate relative to the base support about the axis. The seat is at least partially located in the space. The seat is at least partially sleeved to the base support and configured to move relative to the base support along the axis. The elastic pieces are disposed on the seat and configured to abut against the inner wall surface.

In one or more embodiments of the present disclosure, the base support includes a base plate and a supporting column. The supporting column is connected with the base plate and extends along the axis. The seat is at least partially sleeved to the supporting column. The knob structure further includes a first elastic element. The first elastic element is connected between the seat and the base plate.

In one or more embodiments of the present disclosure, the base support further includes at least one fixing protrusion. The fixing protrusion is protruded from the supporting column. The seat has at least one first limiting portion and at least one second limiting portion. The first limiting portion and the second limiting portion are located at an end of the seat away from the base plate. The first limiting portion is closer to the base plate than the second limiting portion to the base plate. The first limiting portion and the second limiting portion are respectively configured to snap with the fixing protrusion.

In one or more embodiments of the present disclosure, the seat has at least one third limiting portion. The third limiting portion is located at the end of the seat away from the base plate. The third limiting portion is farther away from the base plate than the first limiting portion and the second limiting portion from the base plate. The third limiting portion is configured to snap with the fixing protrusion.

In one or more embodiments of the present disclosure, the seat is further configured to rotate about the axis relative to the supporting column. The seat has at least one first inclined surface, at least one second inclined surface and at least one third inclined surface. The first inclined surface is adjacent to the first limiting portion. The second inclined surface is adjacent to the second limiting portion. The third inclined surface is adjacent to the third limiting portion. The fixing protrusion has a fourth inclined surface. The fourth inclined surface is configured to guide one of the first inclined surface, the second inclined surface and the third inclined surface to slide, to make the seat rotate about the axis relative to the supporting column.

In one or more embodiments of the present disclosure, a quantity of each of the first limiting portion, the second limiting portion and the third limiting portion is plural. The first limiting portions, the second limiting portions and the third limiting portions are evenly distributed about the axis and arranged in a staggered manner.

In one or more embodiments of the present disclosure, a quantity of the fixing protrusion is plural. The fixing protrusions are evenly distributed about the axis.

In one or more embodiments of the present disclosure, the knob structure further includes a button portion. The button portion is elastically connected with the supporting column along the axis. The button portion has a pressing surface configured to press and push the seat to move towards the base plate.

In one or more embodiments of the present disclosure, the knob structure further includes a second elastic element. The second elastic element is connected between the button portion and the supporting column.

In one or more embodiments of the present disclosure, the inner wall surface has a wave shape.

According to an embodiment of the present disclosure, a knob structure includes a base support, a knob portion, a seat and a plurality of elastic pieces. The base support at least partially extends along an axis. The knob portion has an inner wall surface. The inner wall surface surrounds the axis to define a space. A cross-section of the knob portion perpendicular to the axis has an inner edge defining the inner wall surface. The inner edge is substantially circular. A diameter of the inner edge diminishes towards the base support along the axis. The knob portion is signally connected to a processor and configured to rotate relative to the base support about the axis. The seat is at least partially located in the space. The seat is at least partially sleeved to the base support and configured to move relative to the base support along the axis. The elastic pieces are disposed on the seat and configured to abut against the inner wall surface.

In one or more embodiments of the present disclosure, the diameter of the inner edge diminishes towards the base support along the axis in a linear manner.

In one or more embodiments of the present disclosure, the base support includes a base plate, a supporting column and at least one fixing protrusion. The supporting column is connected with the base plate and extends along the axis.

The fixing protrusion is protruded from the supporting column. The seat is at least partially sleeved to the supporting column and elastically connected with the base plate. The seat is further configured to engage with the fixing protrusion at different height levels relative to the base plate.

In one or more embodiments of the present disclosure, the knob structure further includes a button portion. The button portion is elastically connected with the supporting column along the axis. The seat is located between the button portion and the base plate. The button portion has a pressing surface. The pressing surface is configured to press and push the seat to move towards the base plate.

In one or more embodiments of the present disclosure, the inner edge has a wave shape.

The above-mentioned embodiments of the present disclosure have at least the following advantages:
(1) With reference to the characteristic of the function to be controlled, before rotating the knob portion, the user can first move the elastic pieces to an appropriate height level relative to the knob portion, which facilitates the user to carry out appropriate adjustment to the function to be controlled.
(2) A user can rotate the seat about the axis relative to the supporting column by pressing on the button portion through the button shell, so as to select one of the first limiting portion, the second limiting portion and the third limiting portion to snap with the fixing protrusion, in order to change the height level of the elastic pieces relative to the knob portion, which facilitates the user to carry out appropriate adjustment to the function to be controlled.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
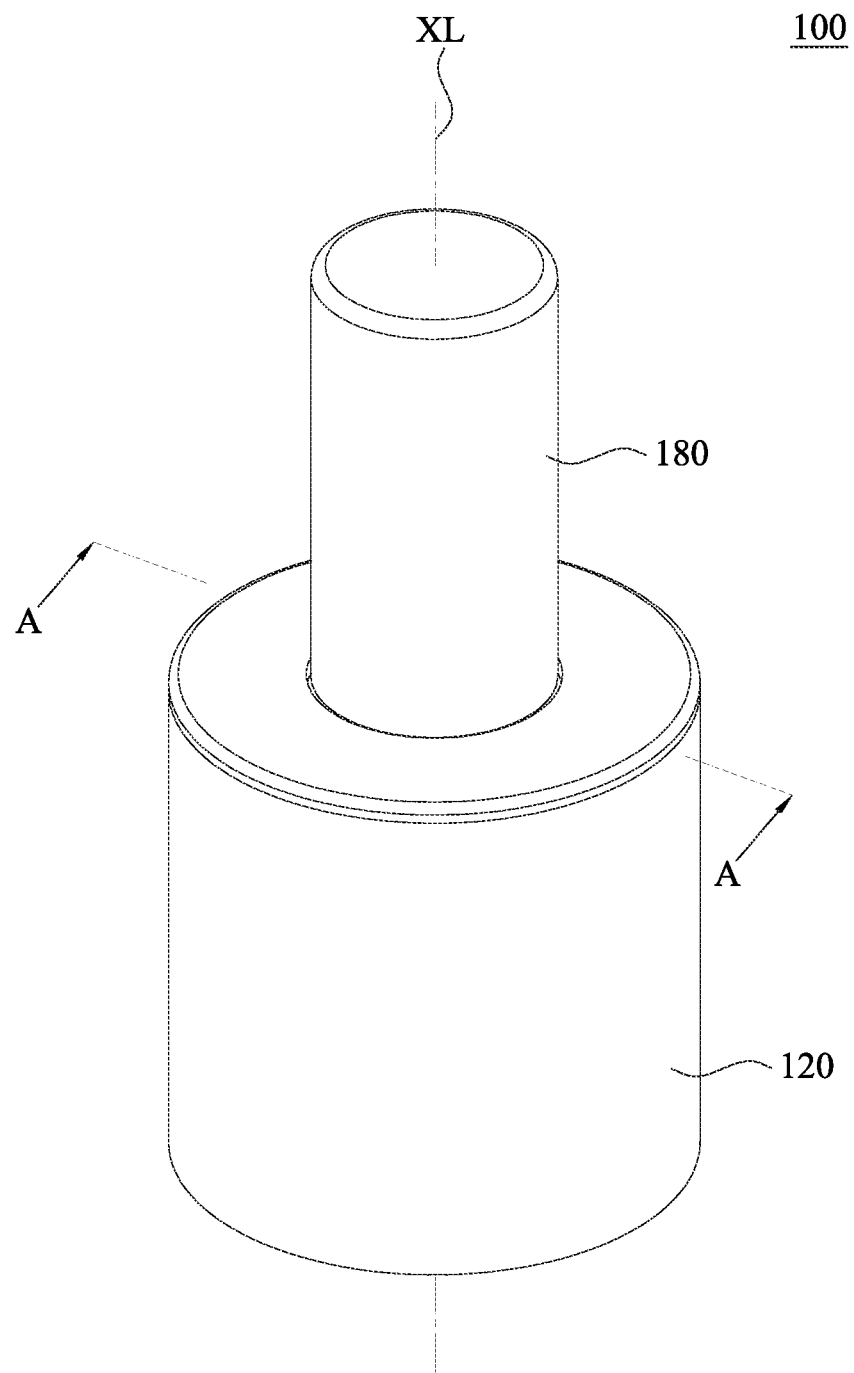
FIG. 1 is a schematic view of a knob structure according to an embodiment of the present disclosure.

Drawings will be used below to disclose embodiments of the present disclosure. For the sake of clear illustration, many practical details will be explained together in the description below. However, it is appreciated that the practical details should not be used to limit the claimed scope. In other words, in some embodiments of the present disclosure, the practical details are not essential. Moreover, for the sake of drawing simplification, some customary structures and elements in the drawings will be schematically shown in a simplified way. Wherever possible, the same reference numbers are used in the drawings and the description to refer to the same or like parts.

Unless otherwise defined, all terms (including technical and scientific terms) used herein have the same meanings as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 2:
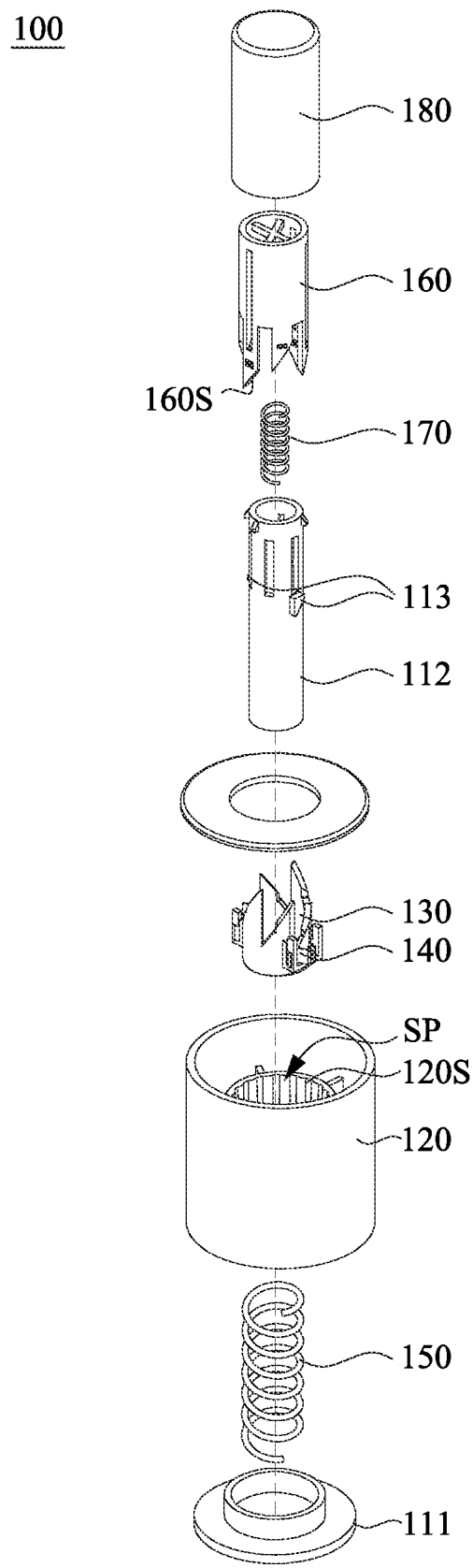
FIG. 2 is an exploded schematic view of the knob structure of FIG. 1.

Reference is made to FIGS. 1-2. FIG. 1 is a schematic view of a knob structure 100 according to an embodiment of the present disclosure. FIG. 2 is an exploded schematic view of the knob structure 100 of FIG. 1. In this embodiment, as shown in FIGS. 1-2, a knob structure 100, being suitable to be disposed, for example, on a car display (not shown), includes a base support 110 and a knob portion 120. The base support 110 is configured to be connected with the car display. The knob portion 120 is signally connected to a processor (not shown) and configured to rotate relative to the base support 110 about an axis XL, so as to control the magnitude of different functions through the processor.

Figure 3:
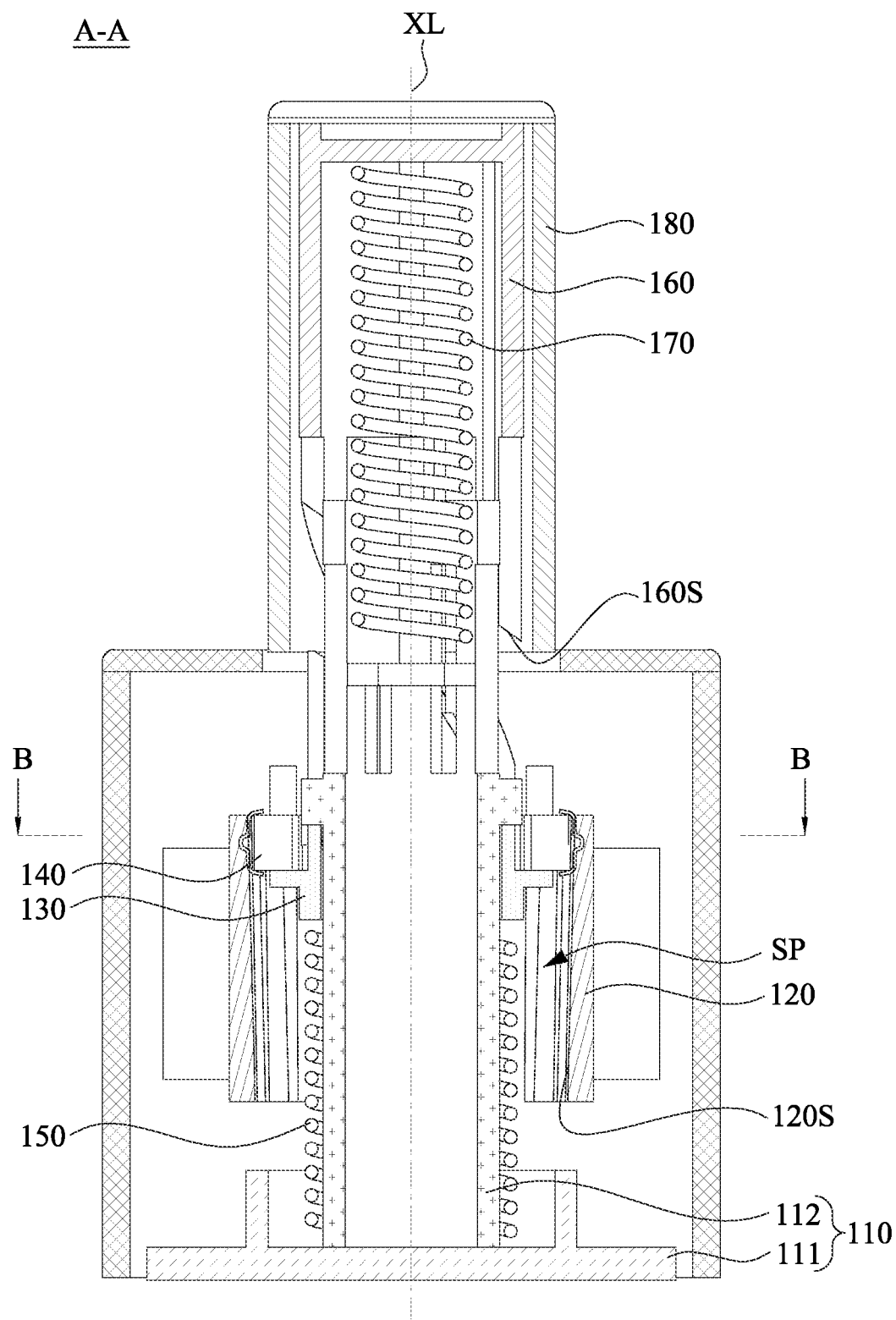
FIG. 3 is a cross-sectional view along the section line A-A of FIG. 1.

Reference is made to FIGS. 2-3. FIG. 3 is a cross-sectional view along the section line A-A of FIG. 1. In this embodiment, as shown in FIGS. 2-3, the knob portion 120 has an inner wall surface 120S. The inner wall surface 120S is inclined to the axis XL and surrounds the axis XL to define a space SP. The knob structure 100 further includes a seat 130 and a plurality of elastic pieces 140. The seat 130 is at least partially located in the space SP. The seat 130 is at least partially sleeved to the base support 110 and configured to move relative to the base support 110 along the axis XL. The elastic pieces 140 are disposed on the seat 130 and configured to abut against the inner wall surface 120S of the knob portion 120.

As mentioned above, the inner wall surface 120S of the knob portion 120 is inclined to the axis XL. In other words, the horizontal distance between the inner wall surface 120S of the knob portion 120 and the axis XL is different at different height levels. Therefore, the elastic pieces 140 receive different levels of compression from the inner wall surface 120S at different height levels. Correspondingly, when a user rotates the knob portion 120, the elastic pieces 140 generate different levels of resistance to the knob portion 120 at different height levels. In this way, with reference to the characteristic of the function to be controlled, before rotating the knob portion 120, the user can first move the elastic pieces 140 to an appropriate height level relative to the knob portion 120, which facilitates the user to carry out appropriate adjustment to the function to be controlled. As shown in FIG. 3, the inclination of the inner wall surface 120S relative to the axis XL makes the dimension of the space SP gradually diminish from top to bottom, such that the pressure received by the elastic pieces 140 from the inner wall surface 120S at a lower position of the inner wall surface 120S is larger than the pressure received by the elastic pieces 140 from the inner wall surface 120S at a higher position of the inner wall surface 120S.

To be specific, as shown in FIGS. 2-3, the base support 110 includes a base plate 111 and a supporting column 112. The supporting column 112 is connected with the base plate 111 and extends along the axis XL. The seat 130 is at least partially sleeved to the supporting column 112. Moreover, the knob structure 100 further includes a first elastic element 150. The first elastic element 150 is connected between the seat 130 and the base plate 111. In practical applications, the first elastic element 150 maintains to provide certain amount of elasticity to the seat 130, such that the seat 130 tends to move away from the base plate 111 of the base support 110. For example, the first elastic element 150 is a spring. However, this does not intend to limit the present disclosure.

In addition, as shown in FIGS. 2-3, the knob structure 100 further includes a button portion 160 and a button shell 180. The button shell 180 is connected with and at least partially covers the button portion 160. The button shell 180 is configured to be pressed by a user. The button portion 160 is elastically connected with the supporting column 112 along the axis XL. The button portion 160 has a pressing surface 160S. The pressing surface 160S is configured to press and push the seat 130 to move towards the base plate 111 of the base support 110. When a user presses on the button shell 180, the button shell 180 together with the button portion 160 move towards the base plate 111 relative to the supporting column 112. The pressing surface 160S of the button portion 160 then presses on the seat 130, and thus pushes the seat 130 to move towards the base plate 111.

Furthermore, as shown in FIGS. 2-3, the knob structure 100 further includes a second elastic element 170. The second elastic element 170 is connected between the button portion 160 and the supporting column 112. When a user presses on the button shell 180 (together with the button portion 160), the second elastic element 170 is compressed and thus stores a certain amount of elastically potential energy. When a user does not touch the button shell 180 anymore, the compressed second elastic element 170 recovers and releases the elastically potential energy stored, such that the button portion 160 moves away from the base plate 111 of the base support 110. For example, the second elastic element 170 is a spring. However, this does not intend to limit the present disclosure.

Figure 4:
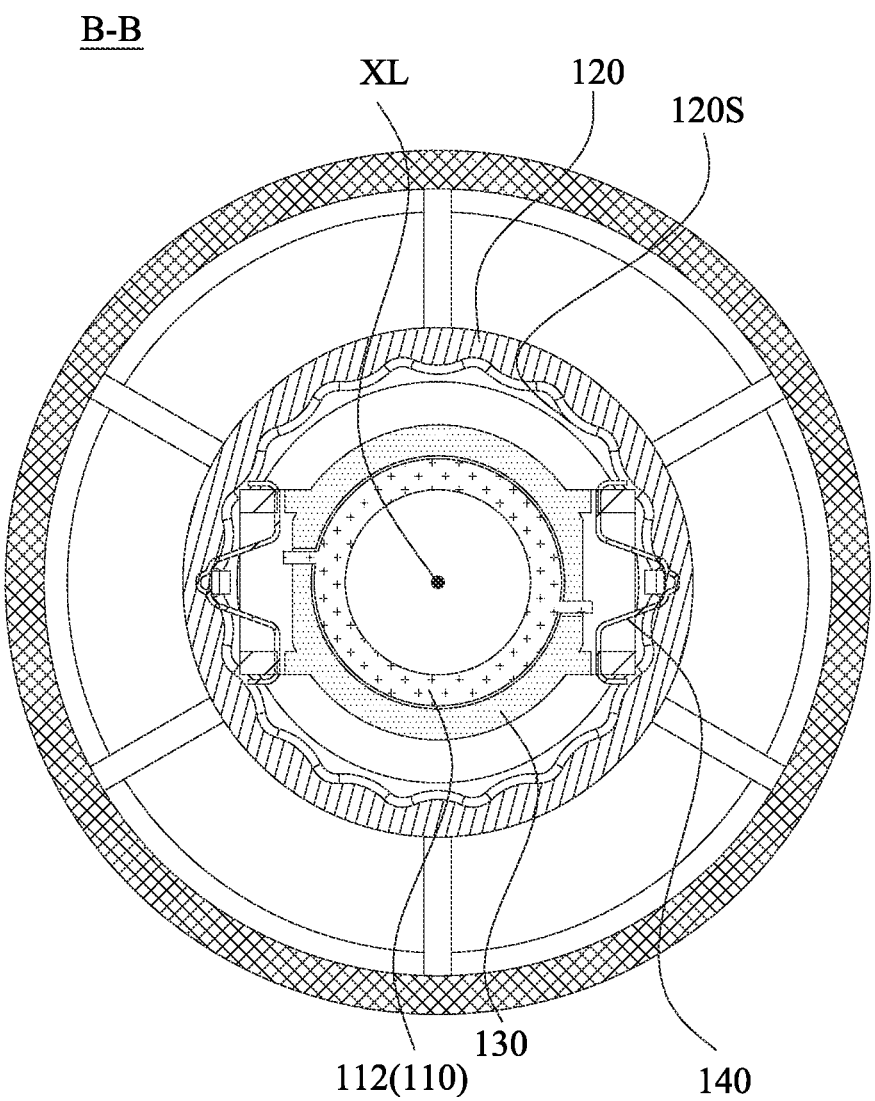
FIG. 4 is a cross-sectional view along the section line B-B of FIG. 3.

Reference is made to FIG. 4. FIG. 4 is a cross-sectional view along the section line B-B of FIG. 3. In this embodiment, as shown in FIG. 4, the inner wall surface 120S of the knob portion 120 has a wave shape. In this way, when a user rotates the knob portion 120 relative to the base support 110 about the axis XL, the force exerting on the elastic pieces 140 from the inner wall surface 120S reciprocally changes, and the resistance that a user encounters when rotating the knob portion 120 also reciprocally changes. Thus, a user can easily feel the magnitude of rotation of the knob portion 120.

Figure 5:
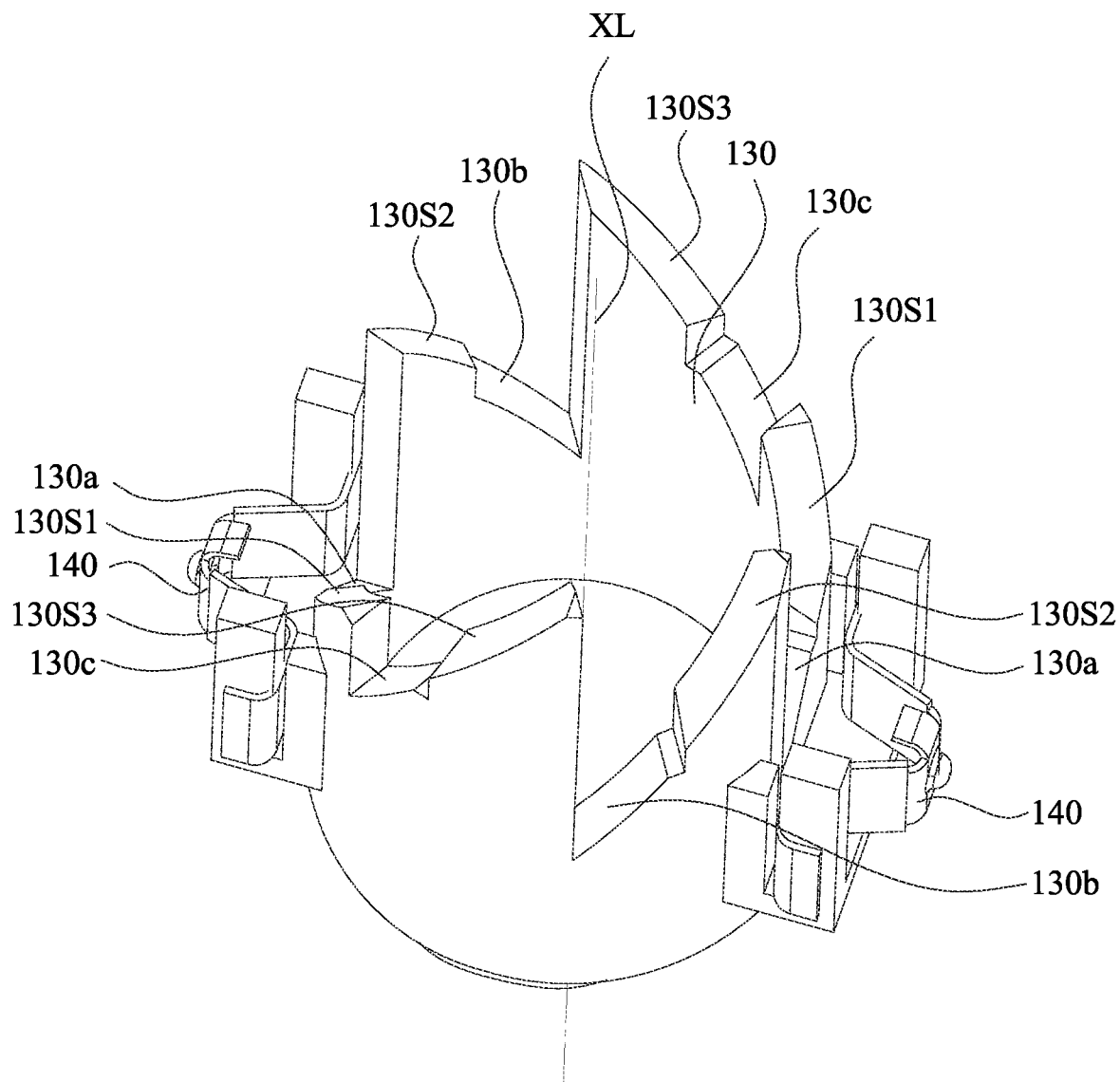
FIG. 5 is an enlarged schematic view of the seat and the elastic pieces of FIGS. 2-4.

Reference is made to FIG. 5. FIG. 5 is an enlarged schematic view of the seat 130 and the elastic pieces 140 of FIGS. 2-4. In this embodiment, as shown in FIG. 5, the seat 130 has at least one first limiting portion 130a, at least one second limiting portion 130b and at least one third limiting portion 130c. The first limiting portion 130a, the second limiting portion 130b and the third limiting portion 130c are located at an end of the seat 130 away from the base plate 111 (please see FIGS. 2-3 for the base plate 111) of the base support 110. The first limiting portion 130a is closer to the base plate 111 than the second limiting portion 130b to the base plate 111. The third limiting portion 130c is farther away from the base plate 111 than the first limiting portion 130a and the second limiting portion 130b from the base plate 111.

Moreover, a quantity of each of the first limiting portion 130a, the second limiting portion 130b and the third limiting portion 130c is plural. The first limiting portions 130a, the second limiting portions 130b and the third limiting portions 130c are evenly distributed about the axis XL and arranged in a staggered manner.

Furthermore, the seat 130 has at least one first inclined surface 130S1, at least one second inclined surface 130S2 and at least one third inclined surface 130S3. The first inclined surface 130S1 is adjacent to the first limiting portion 130a. The second inclined surface 130S2 is adjacent to the second limiting portion 130b. The third inclined surface 130S3 is adjacent to the third limiting portion 130c.

Figure 6:
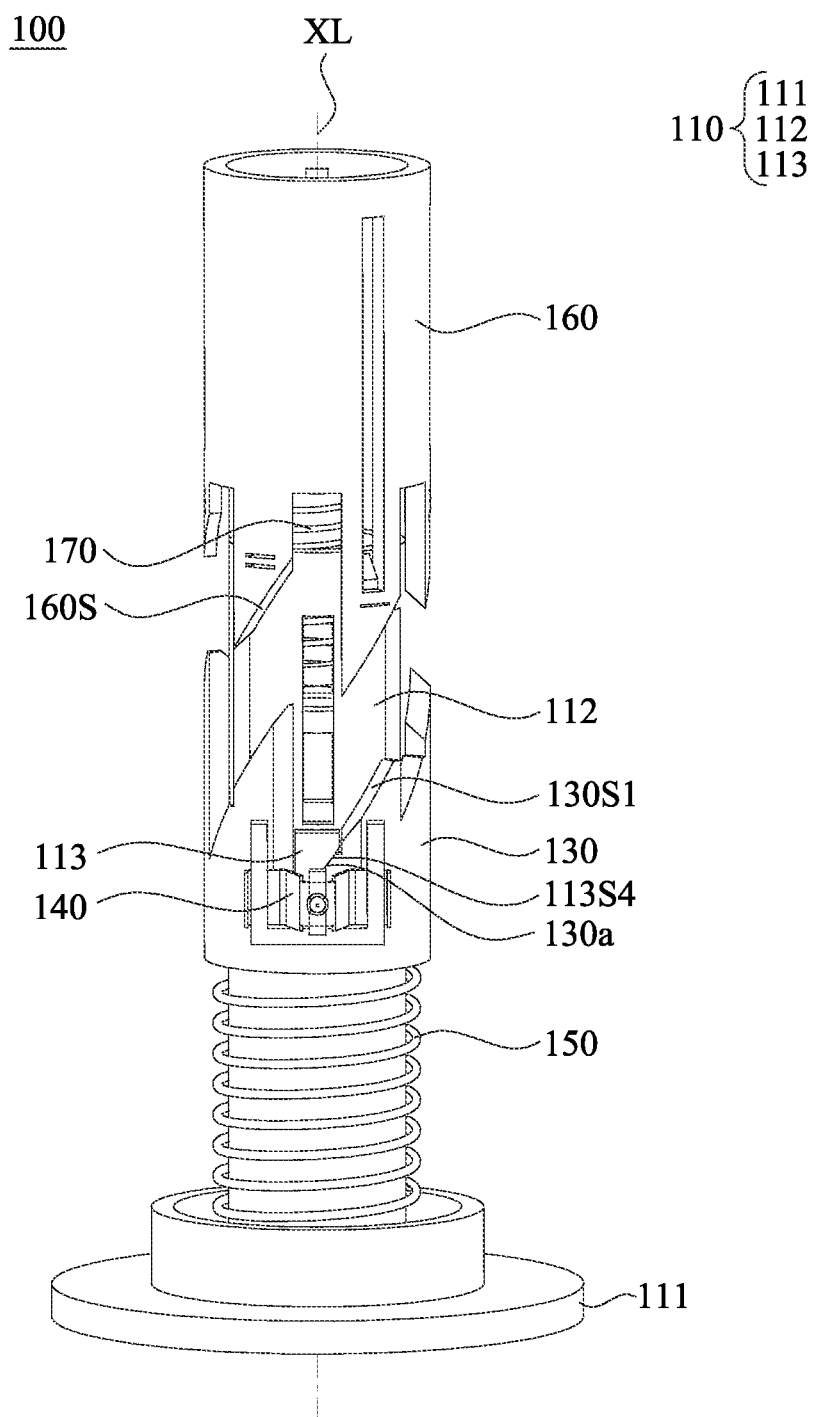
FIGS. 6-10 are views of application processes of the knob structure of FIGS. 1-3, in which the knob portion and the button shell are omitted.

Reference is made to FIG. 6. FIG. 6 is a view of application process of the knob structure 100 of FIGS. 1-3, in which the knob portion 120 and the button shell 180 are omitted. In this embodiment, as shown in FIG. 6, the base support 110 further includes at least one fixing protrusion 113. The fixing protrusion 113 is protruded from the supporting column 112. The first limiting portion 130a, the second limiting portion 130b and the third limiting portion 130c of the seat 130 are respectively configured to snap with the fixing protrusion 113, such that the elastic pieces 140 disposed on the seat 130 can be fixed at three different height levels relative to the inner wall surface 120S. For example, as shown in FIG. 6, the first limiting portion 130a of the seat 130 and the fixing protrusion 113 of the base support 110 are snapped with each other. In practical applications, a quantity of the fixing protrusion 113 is plural, and the fixing protrusions 113 are evenly distributed about the axis XL (please see FIG. 2).

In this embodiment, the seat 130 is further configured to rotate relative to the supporting column 112 of the base support 110 about the axis XL. To be specific, as shown in FIG. 6, the fixing protrusion 113 of the base support 110 has a fourth inclined surface 113S4. The fourth inclined surface 113S4 is configured to guide one of the first inclined surface 130S1, the second inclined surface 130S2 and the third inclined surface 130S3 (please see FIG. 5 for the first inclined surface 130S1, the second inclined surface 130S2 and the third inclined surface 130S3) of the seat 130 to slide, to make the seat 130 rotate about the axis XL relative to the supporting column 112.

Figure 7:
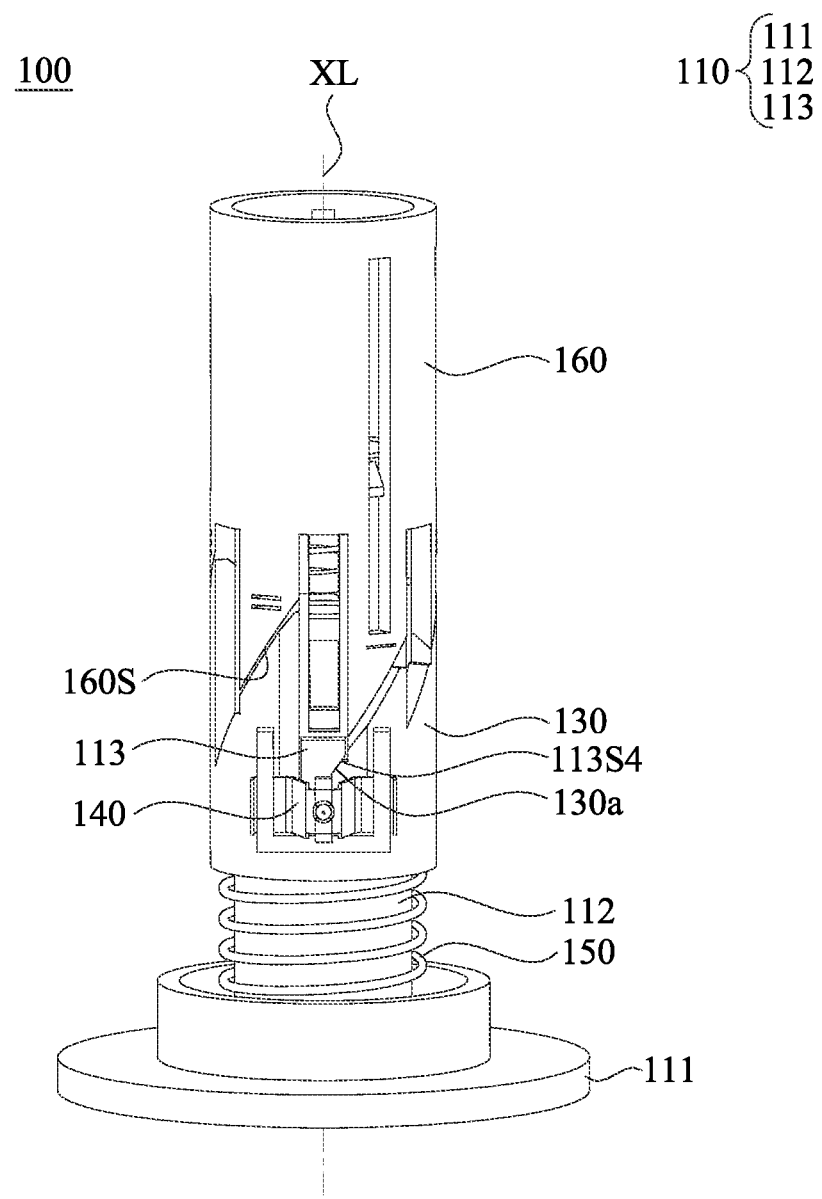

Reference is made to FIGS. 7-10. FIGS. 7-10 are views of application processes of the knob structure 100 of FIGS. 1-3, in which the knob portion 120 and the button shell 180 are omitted. In this embodiment, as shown in FIG. 7, a user (not shown) presses on the button portion 160 through the button shell 180 (not shown), such that the button portion 160 moves towards the base plate 111 of the base support 110 relative to the supporting column 112, and the pressing surface 160S of the button portion 160 presses at least one of the first inclined surface 130S1, the second inclined surface 130S2 and the third inclined surface 130S3 of the seat 130.

Figure 8:
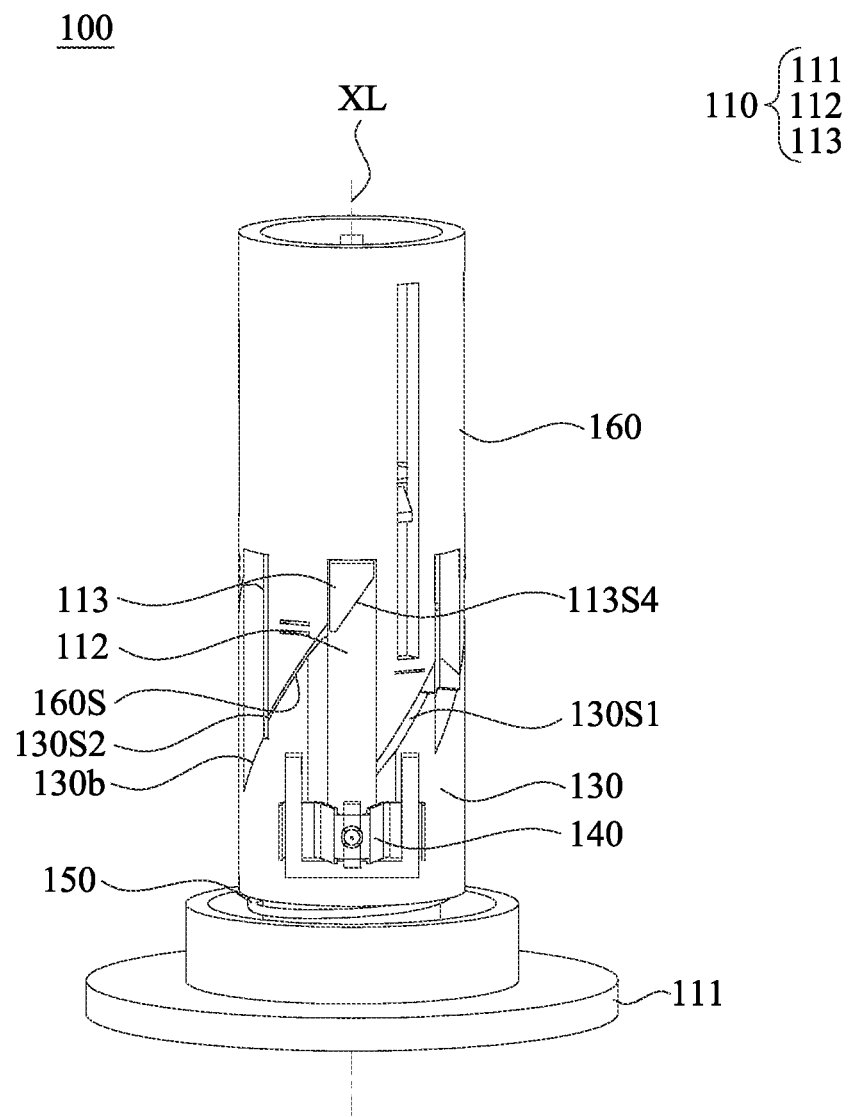
Figure 9:
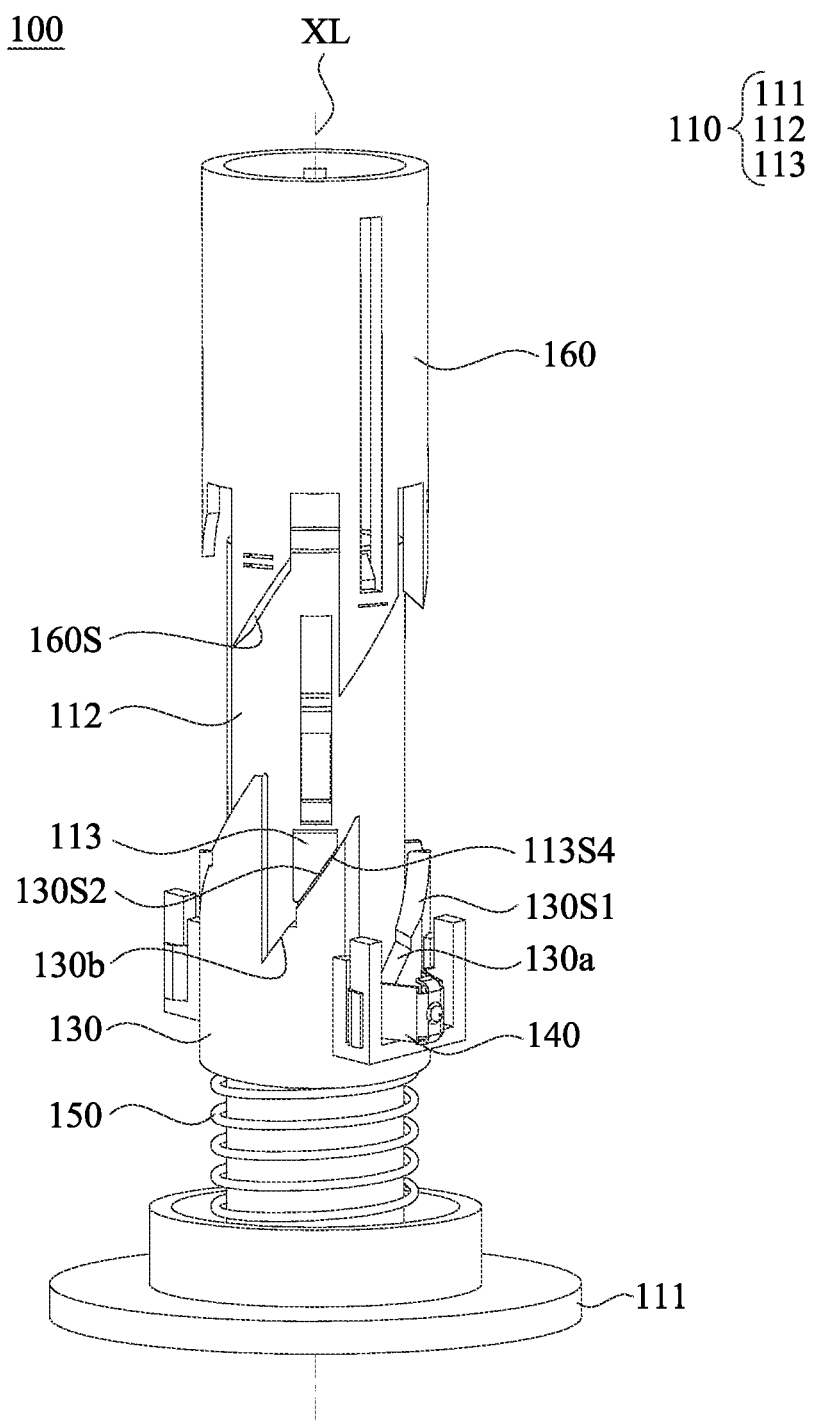

As mentioned above, the first elastic element 150 is connected between the seat 130 and the base plate 111. When the seat 130 moves towards the base plate 111, the first elastic element 150 is compressed and thus stores a certain amount of elastically potential energy. As shown in FIG. 8, the seat 130 is pushed by the button portion 160 to move towards the base plate 111, and the second inclined surface 130S2 adjacent to the second limiting portion 130b is closer to the base plate 111 of the base support 110 than the fixing protrusion 113 to the base plate 111. Afterwards, as shown in FIG. 9, the compressed first elastic element 150 recovers and releases the elastically potential energy stored, such that the third inclined surface 130S3 of the seat 130 slides on the fourth inclined surface 113S4 of the fixing protrusion 113, and the seat 130 is thus rotated about the axis XL relative to the supporting column 112. At this point, as shown in FIG. 9, the button portion 160 is not pressed by a user anymore, and the compressed second elastic element 170 (please see FIGS. 2-3 for the second elastic element 170) recovers and releases the elastically potential energy stored, such that the button portion 160 moves away from the base plate 111 of the base support 110.

Figure 10:
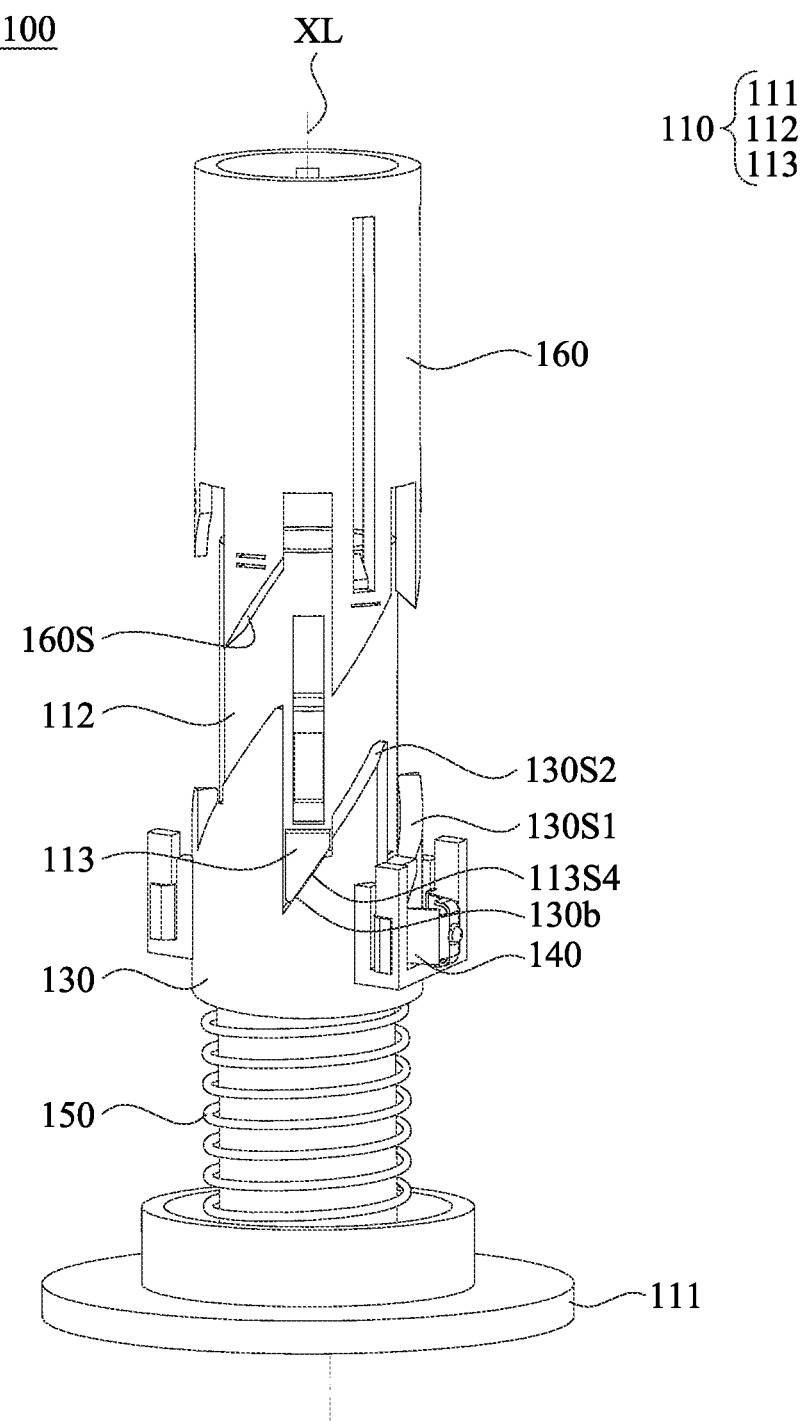

As shown in FIG. 10, as the second inclined surface 130S2 of the seat 130 slides on the fourth inclined surface 113S4 of the fixing protrusion 113, the second limiting portion 130b adjacent to the second inclined surface 130S2 finally snaps with the fixing protrusion 113, such that the relative position between the seat 130 and the base plate 111 of the base support 110 is fixed.

In simple words, as shown in FIGS. 6-10, under the condition that the first limiting portion 130a is originally snapped with the fixing protrusion 113, a user can press on the button portion 160 through the button shell 180, until the second inclined surface 130S2 is closer to the base plate 111 of the base support 110 than the fixing protrusion 113 to the base plate 111, and the compressed first elastic element 150 then pushes the seat 130, such that the second inclined surface 130S2 of the seat 130 slides on the fourth inclined surface 113S4 of the fixing protrusion 113, and the seat 130 is thus rotated about the axis XL relative to the supporting column 112, until the second limiting portion 130b finally snaps with the fixing protrusion 113. In other words, a user can rotate the seat 130 about the axis XL relative to the supporting column 112 by pressing on the button portion 160 through the button shell 180, so as to select one of the first limiting portion 130a, the second limiting portion 130b and the third limiting portion 130c to snap with the fixing protrusion 113, in order to change the height level of the elastic pieces 140 relative to the knob portion 120, which facilitates the user to carry out appropriate adjustment to the function to be controlled.

Figure 11:
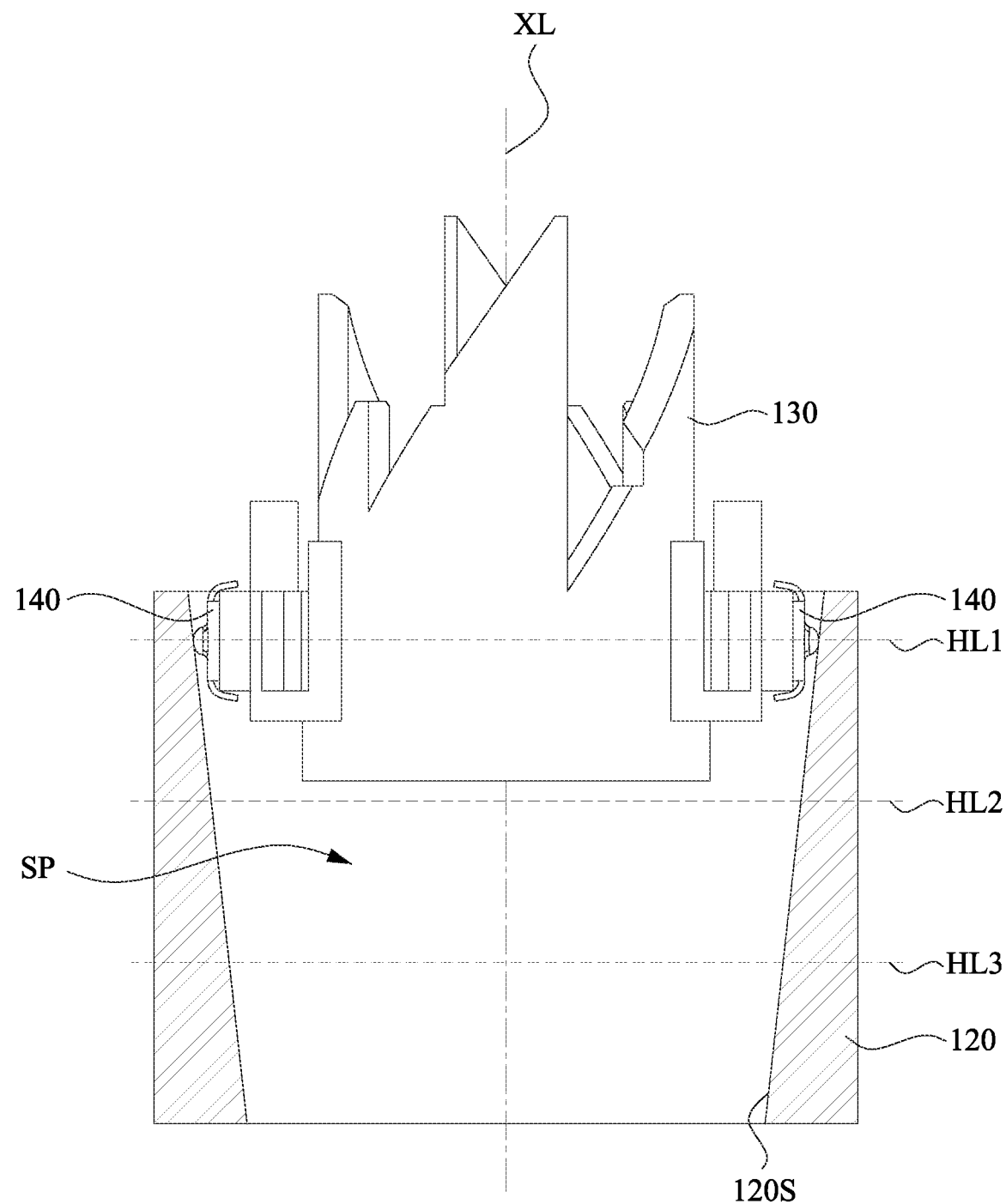
FIG. 11 is a partially cross-sectional view of the relative position between the elastic pieces and the knob portion of FIG. 3.

Reference is made to FIG. 11. FIG. 11 is a partially cross-sectional view of the relative position between the elastic pieces 140 and the knob portion 120 of FIG. 3. In this embodiment, since the seat 130 has the first limiting portion 130a, the second limiting portion 130b, and the third limiting portion 130c of different height levels relative to the base plate 111, the elastic pieces 140 disposed on the seat 130 can be fixed at three different height levels relative to the inner wall surface 120S. As shown in FIG. 11, the level HL1 represents the height level of the elastic pieces 140 abutting against the inner wall surface 120S when the first limiting portion 130a snaps with the fixing protrusion 113, the level HL2 represents the height level of the elastic pieces 140 abutting against the inner wall surface 120S when the second limiting portion 130b snaps with the fixing protrusion 113, the level HL3 represents the height level of the elastic pieces 140 abutting against the inner wall surface 120S when the third limiting portion 130c snaps with the fixing protrusion 113. In other embodiments, according to the actual situations, the seat 130 can have more than three limiting portions, such that the elastic pieces 140 can be fixed at more different height levels relative to the inner wall surface 120S. However, this does not intend to limit the present disclosure.

In conclusion, the aforementioned embodiments of the present disclosure have at least the following advantages:

(1) With reference to the characteristic of the function to be controlled, before rotating the knob portion, the user can first move the elastic pieces to an appropriate height level relative to the knob portion, which facilitates the user to carry out appropriate adjustment to the function to be controlled.

(2) A user can rotate the seat about the axis relative to the supporting column by pressing on the button portion through the button shell, so as to select one of the first limiting portion, the second limiting portion and the third limiting portion to snap with the fixing protrusion, in order to change the height level of the elastic pieces relative to the knob portion, which facilitates the user to carry out appropriate adjustment to the function to be controlled.

Although the present disclosure has been described in considerable detail with reference to certain embodiments thereof, other embodiments are possible. Therefore, the spirit and scope of the appended claims should not be limited to the description of the embodiments contained herein.

It will be apparent to the person having ordinary skill in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A knob structure, comprising:
a base support;
a knob portion having an inner wall surface, the inner wall surface being inclined to an axis and surrounding the axis to define a space, the knob portion being signally connected to a processor and configured to rotate relative to the base support about the axis;
a seat at least partially located in the space, the seat being at least partially sleeved to the base support and configured to move relative to the base support along the axis; and
a plurality of elastic pieces disposed on the seat and configured to abut against the inner wall surface.

2. The knob structure of claim 1, wherein the base support comprises:
a base plate; and
a supporting column connected with the base plate and extending along the axis, the seat is at least partially sleeved to the supporting column,
the knob structure further comprises:
a first elastic element connected between the seat and the base plate.

3. The knob structure of claim 2, wherein the base support further comprises:
at least one fixing protrusion protruded from the supporting column,
wherein the seat has at least one first limiting portion and at least one second limiting portion, the first limiting portion and the second limiting portion are located at an end of the seat away from the base plate, the first limiting portion is closer to the base plate than the second limiting portion to the base plate, the first limiting portion and the second limiting portion are respectively configured to snap with the fixing protrusion.

4. The knob structure of claim 3, wherein the seat has at least one third limiting portion, the third limiting portion is located at the end of the seat away from the base plate, the third limiting portion is farther away from the base plate than the first limiting portion and the second limiting portion from the base plate, the third limiting portion is configured to snap with the fixing protrusion.

5. The knob structure of claim 4, wherein the seat is further configured to rotate about the axis relative to the supporting column, the seat has at least one first inclined surface, at least one second inclined surface and at least one third inclined surface, the first inclined surface is adjacent to the first limiting portion, the second inclined surface is adjacent to the second limiting portion, the third inclined surface is adjacent to the third limiting portion, the fixing protrusion has a fourth inclined surface, the fourth inclined surface is configured to guide one of the first inclined surface, the second inclined surface and the third inclined surface to slide, to make the seat rotate about the axis relative to the supporting column.

6. The knob structure of claim 4, wherein a quantity of each of the first limiting portion, the second limiting portion and the third limiting portion is plural, the first limiting portions, the second limiting portions and the third limiting portions are evenly distributed about the axis and arranged in a staggered manner.

7. The knob structure of claim 6, wherein a quantity of the fixing protrusion is plural, the fixing protrusions are evenly distributed about the axis.

8. The knob structure of claim 2, further comprising:
a button portion elastically connected with the supporting column along the axis, the button portion having a pressing surface configured to press and push the seat to move towards the base plate.

9. The knob structure of claim 8, further comprising:
a second elastic element connected between the button portion and the supporting column.

10. The knob structure of claim 1, wherein the inner wall surface has a wave shape.

11. A knob structure, comprising:
a base support at least partially extending along an axis;
a knob portion having an inner wall surface surrounding the axis to define a space, a cross-section of the knob portion perpendicular to the axis having an inner edge defining the inner wall surface, the inner edge being substantially circular, a diameter of the inner edge diminishing towards the base support along the axis, the knob portion being signally connected to a processor and configured to rotate relative to the base support about the axis;
a seat at least partially located in the space, the seat being at least partially sleeved to the base support and configured to move relative to the base support along the axis; and
a plurality of elastic pieces disposed on the seat and configured to abut against the inner wall surface.

12. The knob structure of claim 11, wherein the diameter of the inner edge diminishes towards the base support along the axis in a linear manner.

13. The knob structure of claim 11, wherein the base support comprises:
a base plate;
a supporting column connected with the base plate and extending along the axis; and
at least one fixing protrusion protruded from the supporting column,
wherein the seat is at least partially sleeved to the supporting column and elastically connected with the base plate, the seat is further configured to engage with the fixing protrusion at different height levels relative to the base plate.

14. The knob structure of claim 13, further comprising:
a button portion elastically connected with the supporting column along the axis, the seat being located between the button portion and the base plate, the button portion having a pressing surface configured to press and push the seat to move towards the base plate.

15. The knob structure of claim 11, wherein the inner edge has a wave shape.

* * * * *